US012781802B2

(12) United States Patent
Houdayer et al.

(10) Patent No.: US 12,781,802 B2
(45) Date of Patent: Nov. 3, 2026

(54) ROLLING BEARING WITH SEALS AND A PERFORATED SPACER RING BETWEEN THE SEALS

(71) Applicant: AKTIEBOLAGET SKF, Gothenburg (SE)

(72) Inventors: Christophe Serge Jean Yves Houdayer, Semblancay (FR); Yannick Sébastien Sarton, Luynes (FR)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 19/194,179

(22) Filed: Apr. 30, 2025

(65) Prior Publication Data

US 2025/0347321 A1 Nov. 13, 2025

(30) Foreign Application Priority Data

May 7, 2024 (DE) ......................... 102024204232.3

(51) Int. Cl.
*F16C 33/78* (2006.01)

(52) U.S. Cl.
CPC ...... *F16C 33/7896* (2013.01); *F16C 33/7886* (2013.01)

(58) Field of Classification Search
CPC .. F16C 19/08; F16C 33/7823; F16C 33/7879; F16C 33/7886; F16C 33/7896
See application file for complete search history.

(56) References Cited

U.S. PATENT DOCUMENTS

| | | | | |
|---|---|---|---|---|
| 11,022,176 | B2 * | 6/2021 | Delaby | F16C 33/7896 |
| 12,326,174 | B2 * | 6/2025 | Huot-Marchand | F16C 19/18 |
| 12,492,728 | B2 * | 12/2025 | Huot-Marchand | F16C 19/08 |
| 12,584,524 | B2 * | 3/2026 | Huot-Marchand | F16C 33/726 |
| 2019/0242435 | A1 | 8/2019 | Baumann et al. | |
| 2019/0323554 | A1 | 10/2019 | Delaby et al. | |
| 2020/0011287 | A1 | 1/2020 | Hofmann et al. | |
| 2024/0200523 | A1 | 6/2024 | Hofmann et al. | |
| 2025/0347323 | A1 * | 11/2025 | Houdayer | F16C 19/08 |

FOREIGN PATENT DOCUMENTS

| | | | |
|---|---|---|---|
| DE | 102015221412 | A1 | 5/2017 |
| EP | 3524838 | A1 | 8/2019 |
| EP | 3591245 | A1 | 1/2020 |
| EP | 3524838 | B1 | 4/2021 |
| EP | 4390164 | A1 | 6/2024 |
| EP | 4390186 | A1 | 6/2024 |

OTHER PUBLICATIONS

Search Report from the British Patent Office dated Sep. 9, 2025 in related application No. GB2503690.6.

* cited by examiner

*Primary Examiner* — James Pilkington
(74) *Attorney, Agent, or Firm* — J-TEK LAW PLLC; Scott T. Wakeman; Mark A. Ussai

(57) ABSTRACT

A rolling bearing includes a first ring and a second ring capable of rotating concentrically relative to one another. The rolling bearing further includes at least two seals and a spacer ring axially arranged between the two seals. The spacer ring includes a flange projecting radially outwardly toward the second ring and an annular axial collar, the spacer ring having at least one axial hole.

10 Claims, 2 Drawing Sheets

ROLLING BEARING WITH SEALS AND A PERFORATED SPACER RING BETWEEN THE SEALS

CROSS-REFERENCE

This application claims priority to German patent application no. 102024204232.3 filed on May 7, 2024, the contents of which are fully incorporated herein by reference.

BACKGROUND OF THE INVENTION

The present invention relates to the field of rolling bearings, and more particularly to large-diameter rolling bearings having an inner ring and an outer ring arranged concentrically about an axis of rotation running in an axial direction.

Large-diameter rolling bearings are known and may be used, for example, in marine applications, such as in a tidal or marine turbine power station, in a tunnel boring machine, in a mining extraction machine or in a wind turbine.

A large-diameter rolling bearing generally comprises two concentric inner and outer rings, and at least one row of rolling elements, such as rollers or balls, arranged between the rings. The bearing also comprises seals disposed between the inner and outer rings to define a closed space inside of which the rolling elements are arranged.

Large-diameter rolling bearings are generally used in aggressive or harsh environments, in particular in marine applications. Seals prevent exterior elements or contaminants, such as dust, abrasive particles, water and marine species (e.g., plankton and algae) from getting inside the bearing and damaging its components. Such exterior elements may also alter or damage the seal itself, leading to a reduction in the service life of the seal.

Generally, a plurality of additional adjacent seals is provided on the bearing front side which is directly in contact with the aggressive/harsh environments, for example with saltwater. These additional seals are fixed to a sealing ring of one of the inner and outer rings and include a sealing lip in sliding contact with a running surface of a sealing ring of the other ring. Hence, several adjacent closed outer chambers are delimited or defined between the sealing lips of the adjacent seals.

The seals may be separated by an annular spacer ring, which is difficult to position or install during assembly of the bearing due to the size and lack of adjustment of the spacer ring.

SUMMARY OF THE INVENTION

It is therefore desirable that a rolling bearing includes effective sealing elements that prevent the entry of exterior element, have increased service life, particularly in aggressive environment, and are easy to implement and install.

One aim of the present invention is to solve the above difficulties.

The present invention relates to a rolling bearing comprising a first ring and a second ring capable of rotating concentrically relative to one another, and at least one row of rolling elements arranged between first and second raceways of the first and second rings, the first ring comprising at least one first rolling ring provided with the first raceway, and the second ring comprising at least one second rolling ring provided with the second raceway, the rolling bearing further comprising at least two seals each having an annular heel mounted on a cylindrical surface of the first ring, and at least one sealing lip in frictional contact with the second ring.

The rolling bearing also comprises a spacer ring mounted on the first ring and axially arranged between the annular heels of the two seals.

According to one aspect of the invention, the spacer ring comprises at least one axial hole.

The axial hole is very effective for purposes of handling the spacer ring during assembly or disassembly of the rolling bearing, as a bolt or another tool can be inserted inside the hole.

Advantageously, the axial hole is an axial through hole opening on either side onto one of the seals. Thereby, the spacer ring can be handled from each side.

Alternatively, the axial hole may be a blind hole.

Preferably, the axial hole comprises a tapping or thread.

In one embodiment, the spacer ring includes two axial holes positioned at diametrically opposed positions.

In another embodiment, the spacer ring comprises more than two axial holes, each axial hole being equidistant from the two adjacent axial holes.

In one embodiment, the spacer ring comprises at least three dissociable or separable segments circumferentially adjacent and forming the spacer ring, each segment comprising at least one axial hole opening on either side onto a separate one of the seals.

In one embodiment, each segment comprises only one axial hole positioned in the middle of the circumferential length of the segments.

In another embodiment, each segment comprises at least two axial holes, each axial hole being positioned regularly or evenly along the circumferential length of each segment.

In another embodiment, the spacer ring is made in one part.

In a particular embodiment, the rolling bearing comprises at least three seals and two spacer rings spaced apart from each other by one of the seals which is interposed axially.

Advantageously, the spacer ring comprises a flange that radially outwardly projects towards the second ring, the flange extending obliquely with a support surface inclined in the same direction as the sealing lip of one of the seals, and an annular axial collar that radially blocks the annular heel of the other seal in a radial outwards direction.

Preferably, the spacer ring abuts radially against the cylindrical surface of the first ring, as the annular heel of each seal abuts radially again the cylindrical surface.

Advantageously, the segments are manufactured by 3D printing, and/or by stamping, and/or by turning, and/or by grinding.

In one embodiment, the first ring is the inner ring and the second ring is the outer ring. Alternatively, the first ring is the outer ring and the second ring is the inner ring.

BRIEF DESCRIPTION OF THE SEVERAL VIEWS OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
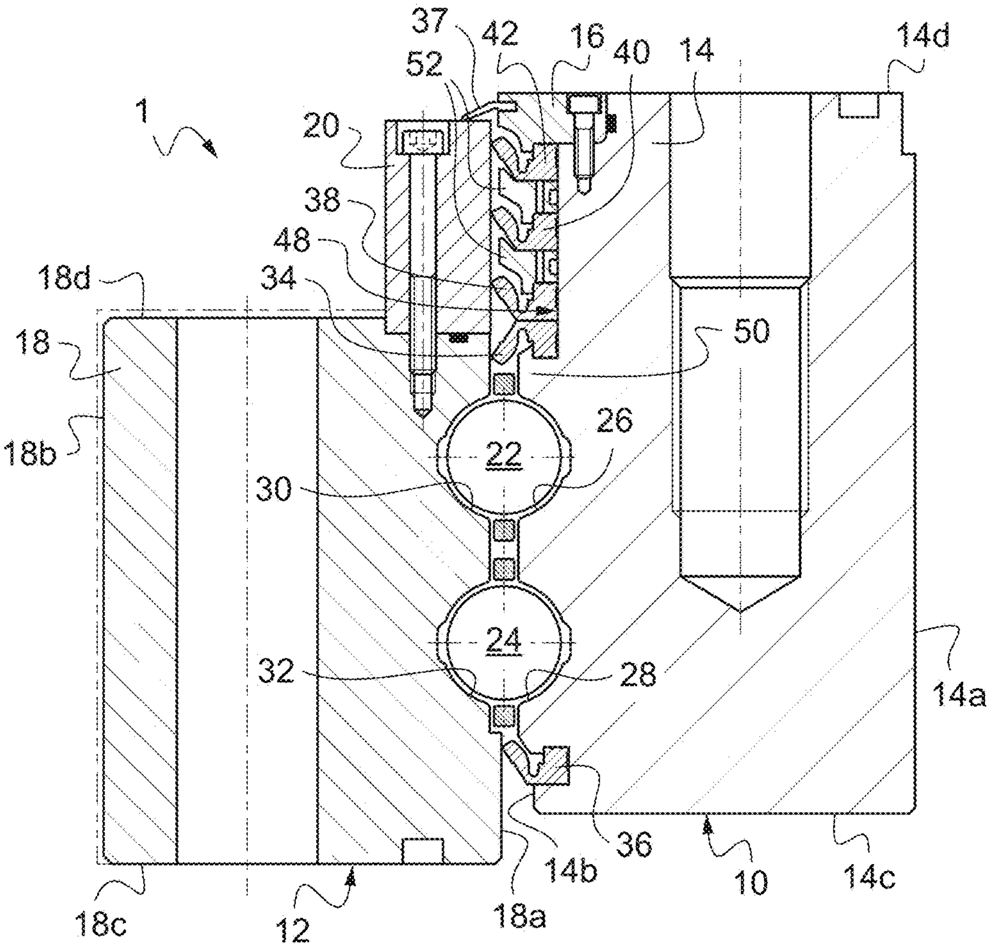
FIG. 1 is a cross-section of a rolling bearing according to the invention.

The rolling bearing 1 as illustrated on FIG. 1 is a large-diameter rolling bearing comprising a first ring 10 and a second ring 12. In the illustrated example, the first ring 10 is the outer ring whereas the second ring 12 is the inner ring. The rolling bearing 1 may be used, for example, in a tidal or marine turbine power station, a tunnel boring machine, a wind turbine, a large offshore crane or any other application (s) using a large diameter rolling bearing.

The outer and inner rings 10, 12 are concentric and extend axially along the bearing rotation axis (not shown) which runs in an axial direction. In this illustrated example, the rings 10, 12 are of the solid type.

The outer ring 10 includes a first rolling ring 14 and a sealing ring 16 secured to the first rolling ring 14. The inner ring 12 similarly includes a second rolling ring 18 and a sealing ring 20 secured to the second rolling ring 18. Alternatively, the rolling ring 18 and the sealing ring 20 may be made in one part or integrally formed. The sealing ring 16 of the outer ring 10 partially and radially surrounds the sealing ring 20 of the inner ring 12.

In the illustrated example, the rolling bearing also comprises two rows of balls 22, 24 which are arranged between two first raceways 26, 28 of the first rolling ring 14 of the outer ring 10 and two second raceways 30, 32 of the second rolling ring 18 of the inner ring 12.

The second rolling ring 18 of the inner ring 10 comprises an outer cylindrical surface 18*a* on which the raceways 30, 32 are formed. The raceways 30, 32 are oriented radially outward. The second rolling ring 18 also includes an inner cylindrical surface or bore 18*b* which is radially opposite to the outer surface 18*a*. The second rolling ring 18 further comprises two opposite first and second frontal surfaces 18*c*, 18*d*, respectively, which axially delimit the outer surface 18*a* and the bore 18*b*. The frontal surfaces 18*c*, 18*d* delimit the axial thickness of the second rolling ring 18.

The first rolling ring 14 of the outer ring 10 includes an outer cylindrical surface 14*a* and a cylindrical surface 14*b*, which is radially opposite to the outer surface 14*a* and on which the raceways 26, 28 are formed. The raceways 26, 28 are oriented radially inward. The first rolling ring 14 further includes two opposite first and second frontal surfaces 14*c*, 14*d*, respectively, which axially delimit the outer surface 14*a* and the cylindrical surface 14*b*. The frontal surfaces 14*c*, 14*d* delimit the axial thickness of the first rolling ring 14.

The rolling bearing 1 further comprises, axially on each side of the rolling rings 14 and 18, two annular seals 34, 36 mounted on the first rolling ring 14 and provided to close or enclosed the radial space that exists between the rolling rings 14, 18. The radial space is defined between the surface 14*b* of the first rolling ring 14 and the outer surface 18*a* of the second rolling ring 18. An annular closed rolling space (not referenced) is defined between the rolling rings 14, 18 and the seals 34, 36 in which the rows of balls 22, 24 are housed. Advantageously, the rolling space is filled with lubricant.

Each seal 34, 36 is mounted into a groove (not referenced) formed on the cylindrical surface 14*b* of the first rolling ring 14 and comes into contact with the second rolling ring 18. The seal 34 contacts the outer surface 18*a* of the second rolling ring 18. The seal 36 contacts the outer surface 18*a* of the second rolling ring 18. Alternatively, it is possible to provide a reversed arrangement for at least one of the two seals 34, 36 with the seal 34 or 36 being mounted on the second rolling ring 18 and coming into friction contact with the first rolling ring 14.

The sealing ring 16 of the outer ring 10 is mounted axially in contact against the frontal surface 14*d* of the first rolling ring 14. The sealing ring 16 protrudes axially with regard to the first rolling ring 14. The sealing ring 16 is reversely attached or secured to the first rolling ring 14. The sealing ring 16 partially and radially surrounds the sealing ring 20 of the inner ring 12. Each of the sealing rings 16, 20 may be made of stainless steel or treated steel with a painting or anti-corrosion treatment.

The sealing ring 16 also comprises a seal lip 37 extending from the sealing ring 16 toward the sealing ring 20 in order to prevent sand or particles from entering between the first ring 10 and the second ring 12.

Figure 2:
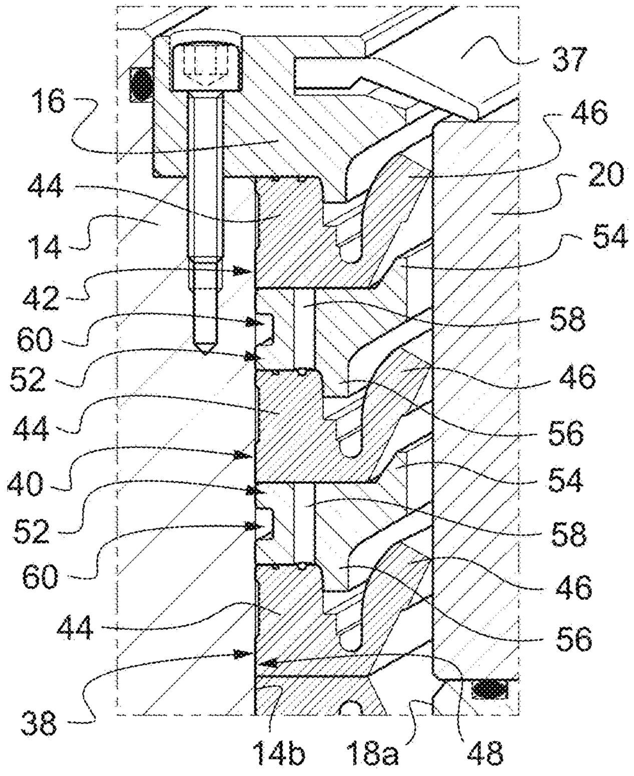
FIG. 2 is a partial cross-section of the rolling bearing of FIG. 1 according to other cutting planes.

As more precisely illustrated on FIG. 2, a plurality of successive annular seals are radially provided between the first rolling ring 14 of the outer ring and the sealing ring 20 of the inner ring.

In the illustrated example, the rolling bearing 1 is provided with first, second, and third successive seals 38, 40 and 42, respectively, supported by the first rolling ring 14 of the outer ring 10. The seals 38, 40 and 42 are arranged successively in the axial direction; i.e., are arranged axially spaced apart.

The seals 38, 40 and 42, as well as the annular seals 34 and 36, may be made of an elastomeric material, for example polyurethane, or any other appropriate sealing material.

The seals are intended to limit the infiltration of liquids, particles and other contaminants from the subsea environment into the space between the inner ring 12 and the outer ring 10.

The first, second, and third successive seals 38, 40 and 42 are axially disposed outwardly with respect to the annular seal 34.

Each one of the seals 38, 40 and 42 is provided with an annular heel 44 and with a sealing lip 46 projecting from the heel 44. In the illustrated example, each sealing lip 46 extends inwardly and obliquely from the annular heel 44. Each sealing lip 46 extends obliquely outwardly.

The sealing lips 46 are flexible in the radial direction. Each sealing lips 46 is elastically deformed and in sliding frictional contact with a sliding contact surface of the second ring 12, preferably a surface of the second sealing ring 20, for example at the same level as the outer surface 18*a*.

The cylindrical surface 14*b* is more precisely provided with an annular groove 48 open radially toward the outer ring 10. The annular groove 48 is axially bounded between a shoulder 50 and the first sealing ring 16. The shoulder 50 is formed when removing material from the cylindrical surface 14*b* to form the groove 48.

The seals 34, 38, 40 and 42 are mounted on the cylindrical surface 14*b*, more precisely in the annular groove 48.

The rolling bearing 1 also comprises a first spacer ring 52 and a second spacer ring 52 each arranged in the annular groove 48. Each one of the first and second spacer rings 52 is annular. The first spacer ring 52 is axially mounted between the annular heels 44 of seals 38 and 40, respectively. The second spacer ring 52 is axially mounted between the annular heels 44 of seals 40 and 42, respectively.

In the depicted embodiment, the two spacer rings 52 are similar or similarly formed.

Each spacer ring 52 includes a flange 54 that projects radially outwardly toward the second ring 12. The flange 54 extends obliquely and is provided with a support surface inclined in the same direction as the sealing lip 46 of one seal, for example the second seal 40, in order to prevent any reversion or inversion of the sealing lip 46.

The spacer ring 52 further includes an annular axial collar 56 configured to radially block the annular heel 44 of another one of the seals 38, 40 on the axial side of the ring 52 opposed to the seal 40, 42 toward which the flange 54 extends, so that the seal 38 or 40 is prevented from displacing in a radial outward direction.

The annular heels 44 of the axially adjacent seals 38, 40 and 42 are axially maintained between the first sealing ring 16, the different spacer rings 52, and the seal 34, the seal 34 being maintained by the shoulder 50.

Furthermore, the annular heel 44 of each one of the seals 38, 40 and 42 is radially maintained between the annular axial collar 56 and the cylindrical surface 14*b*, more precisely the section of the cylindrical surface 14*b* inside the annular groove 48.

Figure 3:
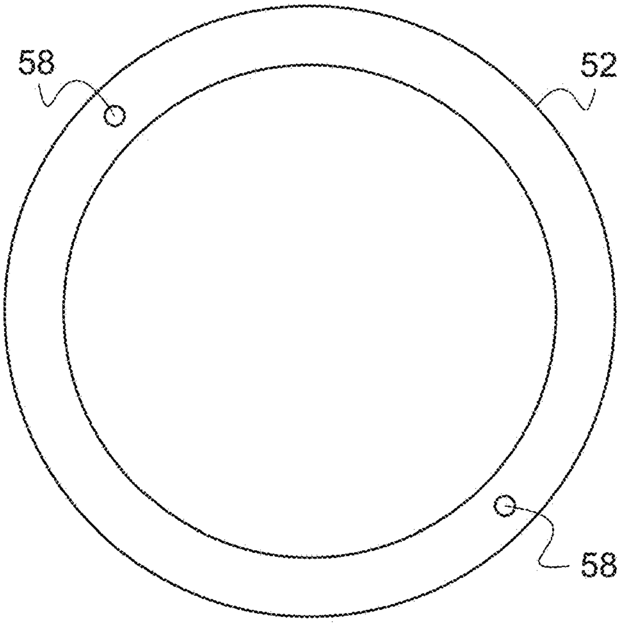
FIG. 3 is a schematic view of a first embodiment of a spacer ring of the rolling bearing of FIG. 1.

In the embodiment illustrated in FIG. 3, the spacer rings 52 are further provided with at least one axial hole 58, and preferably two axial holes 58 located at diametrically opposed positions (i.e., located about one-hundred eighty degrees apart).

The one or more axial hole(s) 58 are provided in order to facilitate handling of each spacer ring 52 during assembly or disassembly of the rolling bearing 1.

More than two axial holes 58 can be provided in each one of the spacer rings 52, for example three or four, each axial hole 58 being spaced equidistant from two other, adjacent axial holes 58.

Preferably, the axial holes 58 are each an axial through hole 58 that opens on each one of the two axial sides of the spacer ring 52 onto one of the seals 38 or 40 and 40 or 42, respectively.

Advantageously, each axial hole 58 comprises a tapping or thread in order to facilitate the insertion of a screw or a bolt and to connect the spacer ring 52 to a lifting machine or device.

Each spacer ring 52 also includes an annular groove 60 facing the cylindrical surface 14*b* of the first ring 10. The annular groove 60 is designed to be in fluid communication with one or more radial channels (none shown) extending through the spacer ring 52 for the purpose of sealing testing, for example an air-leakage test, or for lubrication purposes.

Figure 4:
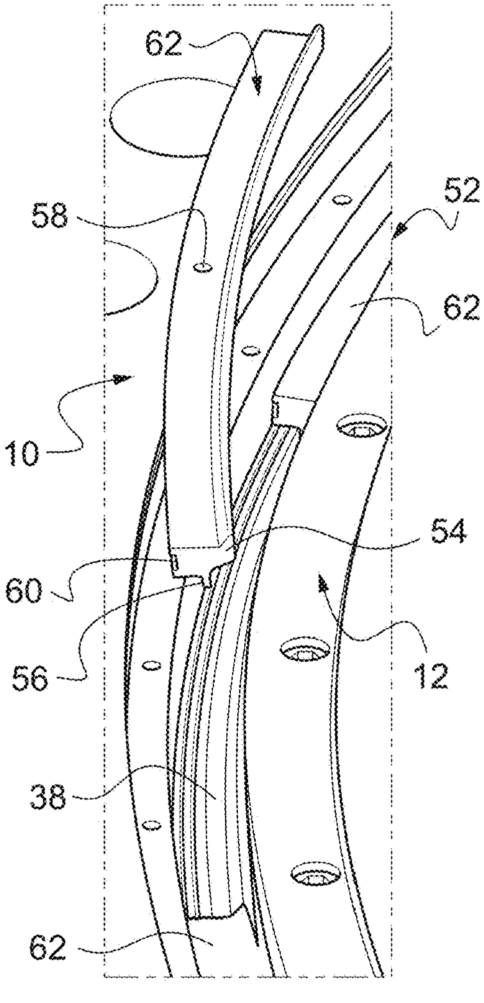
FIG. 4 is a schematic view of a second embodiment of a segmented spacer ring of the rolling bearing of FIG. 1.

A second embodiment of the spacer ring 52 is shown partly on FIG. 4, in which the spacer ring 52 is divided in the circumferential direction such that the spacer ring 52 is segmented. The spacer ring 52 includes at least three dissociable or separable successive circumferential segments 62 circumferentially adjacent to each other so as to form the spacer ring 52. One spacer ring 52 can include between three (3) and fifty (50) separate segments 62, preferably between three (3) and twenty-five (25) segments.

Each segment 62 is provided with a first circumferential end and with a second circumferential end which delimit the segment in the circumferential direction. The first circumferential end of each one of the segments 62 abuts in the circumferential direction against the second circumferential end of one successive segment 62, and the second circumferential end of the segment 62 abuts in the circumferential direction against the first circumferential end of one other successive segment 62.

In one embodiment, the segments 62 may be identical one to another or identically formed. During assembly of the bearing 1, each separate segment 62 is positioned against one of the seals and all of the segments 62 together form the spacer ring 52. The last segment 62 to be positioned can be adjusted in terms of circumferential length and position to the free space still available in order to create a keystone and provide a desired rigidity of the spacer ring 52.

The segments 62 of each spacer ring 52 are easy to be install axially during assembly of the rolling bearing 1. The segments 62 are also easy to be removed and replaced by new elements during a maintenance operation.

Moreover, the segments 62 of each spacer ring 52 minimize the impact or potential of a deformation of the spacer ring 52, in particular for a large diameter, for example a diameter of greater than one meter.

In this embodiment, each segment 62 of each spacer ring 52 may include a single axial hole 58, the axial hole 58 preferably being positioned in the middle of the circumferential length of the segment 62. The axial hole 58 is provided for purposes of handling the segments 62 during assembly or disassembly of the rolling bearing 1.

In one embodiment, each segment 62 of each spacer ring 52 may include two or more axial holes 62, each axial hole 62 being positioned regularly or evenly spaced apart along the circumferential length of each segment 62.

Advantageously, each axial hole 62 includes a tapping or thread in order to facilitate the insertion of a screw or a bolt and to connect the spacer ring 52 to a lifting machine. Advantageously, each axial hole 62 is a through-hole.

Each spacer ring 52 also includes an annular groove 60 facing the cylindrical surface 14*b* of the first ring 10. The annular groove 60 is designed to be in fluid communication with radial channels (not shown) extending through the spacer ring 52 for the purpose of sealing testing, for example air-leakage test, or for lubrication purposes.

Alternatively, the rolling bearing 1 may include a different number of seals and/or of spacer rings.

Otherwise, as previously mentioned, in the illustrated examples, the first ring 10 of the rolling bearing 1 is the outer ring whereas the second ring 12 is the inner ring. As an alternative, it is possible to provide a reversed arrangement in which the first ring 10 is formed as the inner ring and the second ring 12 is formed as the outer ring.

In the described examples, the rolling bearing 1 comprises two rows of rolling elements 22, 24. Alternatively, the rolling bearing 1 may comprise only one row of rolling elements, or three or more rows of rolling elements. In the illustrated example, the rolling elements 22, 24 are balls. The rolling bearing 1 may comprise other appropriate types of rolling elements, such as for example, cylindrical rollers, tapered rollers, needles, etc. or any combination thereof.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A rolling bearing comprising:

a first ring including at least one first rolling ring provided with a first raceway and a cylindrical surface;

a second ring including at least one second rolling ring provided with a second raceway, the first and second rings being capable of rotating concentrically relative to one another, at least one row of rolling elements arranged between the first and second raceways of the first and second rolling rings;

at least two seals, each seal having an annular heel mounted on the cylindrical surface of the first ring and a sealing lip in frictional contact with the second ring; and at least one spacer ring mounted on the first ring and axially arranged between the annular heels of the at least two seals, the at least one spacer ring including at least one axial hole.

2. The rolling bearing according to claim 1, wherein the at least one spacer ring has two opposing axial sides and the at least one axial hole of the at least one spacer ring is an axial through hole opening on each one of the two axial sides of the spacer ring onto each one of the two seals.

3. The rolling bearing according to claim 1, wherein the at least one axial hole includes a thread.

4. The rolling bearing according to claim 1, wherein the at least one spacer ring includes at least two of the axial holes located at diametrically opposed positions.

5. The rolling bearing according to claim 1, wherein the at least one spacer ring includes more than two axial holes, each one of the axial holes being spaced equidistant from two adjacent axial holes.

6. The rolling bearing according to claim 1, wherein the at least one spacer ring includes at least three separate segments circumferentially adjacent and forming the spacer ring, each segment having at least one axial hole.

7. The rolling bearing according to claim 6, wherein each one of the segments of the at least one spacer ring includes a single axial hole positioned in a middle of a circumferential length of the segment.

8. The rolling bearing according to claim 6, wherein each one of the segments of the at least one spacer ring includes at least two axial holes, the at least two axials hole being spaced apart along a circumferential length of each segment.

9. The rolling bearing according to claim 1, wherein the at least two seals includes at least three seals and the at least one spacer ring includes two spacer rings spaced axially apart from each other such that one of the at least three seals is interposed axially between the two spacer rings.

10. The rolling bearing according to claim 1, wherein the at least one spacer ring includes a flange, the flange projecting radially toward the second ring, the flange extending obliquely with a support surface inclined in a same direction as the sealing lip of one of the at least two seals, and an annular axial collar configured to radially block an annular heel of the other one of the at least two seals to prevent the seal from displacing in a radial direction.

* * * * *